(12) United States Patent
Adams et al.

(10) Patent No.: US 10,813,278 B2
(45) Date of Patent: Oct. 27, 2020

(54) DEPTH AND DOWN PRESSURE CONTROL OF AN AGRICULTURAL FERTILIZER ROW UNIT

(71) Applicant: CNH Industrial America LLC, New Holland, PA (US)

(72) Inventors: Brian T. Adams, Centralia, MO (US); Keith W. Wendte, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/291,046

(22) Filed: Mar. 4, 2019

(65) Prior Publication Data

US 2019/0191619 A1    Jun. 27, 2019

Related U.S. Application Data

(62) Division of application No. 15/407,664, filed on Jan. 17, 2017, now Pat. No. 10,264,724.

(51) Int. Cl.
*A01C 7/20*     (2006.01)
*A01C 5/06*     (2006.01)
(Continued)

(52) U.S. Cl.
CPC .............. *A01C 7/205* (2013.01); *A01C 7/203* (2013.01); *A01B 49/06* (2013.01); *A01C 5/062* (2013.01); *A01C 23/025* (2013.01)

(58) Field of Classification Search
CPC .. A01C 5/062; A01C 5/06; A01C 5/00; A01C 23/024; A01C 23/023; A01C 23/02;
(Continued)

(56) References Cited

U.S. PATENT DOCUMENTS 4,646,620 A    3/1987  Buchl
6,085,846 A    7/2000  Buchl et al.
(Continued)

FOREIGN PATENT DOCUMENTS

EP    0 761 084 A1    3/1997

OTHER PUBLICATIONS

"COP and COP SUPREMA Planters", Tatu Marchesan, Feb. 2004 (90 pages).
(Continued)

*Primary Examiner* — Christopher J. Novosad
(74) *Attorney, Agent, or Firm* — Rebecca L. Henkel; Rickard K. DeMille

(57) ABSTRACT

A fertilizer row unit including a toolbar coupling, first and second suspension members, a pressure applying device, a wheel assembly, a knife assembly and a wheel down pressure system. The first suspension member has a first end pivotally coupled to the toolbar coupling. The second suspension member is generally parallel to the first suspension member. The pressure applying device is coupled to the first or second suspension member. The wheel assembly has at least one wheel. The knife assembly is pivotally coupled to both the first and second suspension members. The wheel down pressure system is coupled to the wheel assembly, the wheel down pressure system substantially maintaining a selected pressure on the wheel assembly while the pressure applying device applies varying pressure to at least the first suspension member and the second suspension member.

9 Claims, 4 Drawing Sheets

(51) Int. Cl.
*A01C 23/02* (2006.01)
*A01B 49/06* (2006.01)

(58) Field of Classification Search
CPC ....... A01C 23/00; A01C 23/025; A01C 7/205;
A01C 7/201; A01C 7/20; A01C 7/00;
A01C 7/203; A01B 49/06; A01B 49/04;
A01B 49/00
See application file for complete search history.

(56) References Cited

U.S. PATENT DOCUMENTS

| | | |
|---|---|---|
| 6,148,747 A | 11/2000 | Deckler et al. |
| 6,701,857 B1 | 3/2004 | Jensen et al. |
| 6,983,705 B1 | 1/2006 | Gust |
| 7,308,859 B2 | 12/2007 | Wendte et al. |
| 7,360,494 B2 | 4/2008 | Martin |
| 7,481,278 B1 | 1/2009 | Pomedli et al. |
| 7,743,718 B2 | 6/2010 | Bassett |
| 7,946,232 B2 | 5/2011 | Patwardhan et al. |
| 8,078,367 B2 | 12/2011 | Sauder et al. |
| 8,186,287 B2 | 5/2012 | Schilling et al. |
| 8,235,130 B2 | 8/2012 | Henry et al. |
| 8,448,717 B2 | 5/2013 | Adams et al. |
| 8,479,669 B2 | 7/2013 | Shoup |
| 8,544,397 B2 | 10/2013 | Bassett |
| 2009/0235853 A1* | 9/2009 | Schaffert ............. A01C 5/064 111/163 |
| 2012/0125244 A1 | 5/2012 | Beaujot |
| 2013/0032363 A1 | 2/2013 | Curry et al. |
| 2013/0192186 A1 | 8/2013 | Bassett |
| 2013/0213676 A1 | 8/2013 | Bassett |

OTHER PUBLICATIONS

"Seeding Quality", Air Drills, Sunflower Manufacturing, Oct. 10, 2013 (8 pages).

* cited by examiner

DEPTH AND DOWN PRESSURE CONTROL OF AN AGRICULTURAL FERTILIZER ROW UNIT

CROSS-REFERENCE TO RELATED APPLICATIONS

The present invention is a divisional non-provisional utility patent application which is based on and takes priority from U.S. patent application Ser. No. 15/407,664, filed Jan. 17, 2017, entitled "DEPTH AND DOWN PRESSURE CONTROL OF AN AGRICULTURAL FERTILIZER ROW UNIT," which is hereby incorporated by reference herein in its entirety.

BACKGROUND OF THE INVENTION

1. Field of the Invention

The present invention relates to agricultural implements, and, more particularly, to a down pressure control system for the press wheel of a fertilizer row unit of an agricultural implement.

2. Description of the Related Art

The application of fertilizer and more particularly liquid fertilizer over the surface of the ground has been widely practiced for many years, but has been found to be unsatisfactory because the fertilizer penetrates the surface of the soil relatively slowly, which results in part of the fertilizer evaporating before it is absorbed by the soil. Also, rainfall can wash away much of the fertilizer that remains on the surface. To overcome these problems, placement of liquid or gaseous fertilizer in a depth of the soil has been carried out and has been found to be beneficial to plant growth.

Fertilizer blade assemblies are typically employed by farmers to deliver nitrogen enriching fertilizers such as anhydrous ammonia to a targeted zone beneath the surface of the soil of a crop field while causing a minimum of disruption to the structure of the upper layer of the top soil. Fertilizer blade assemblies are often used by farmers to keep the disturbance of the soil at a minimum. By preserving the structure of the upper layer of top soil, the moisture retaining capacity of the soil is retained and it also makes it easier for new crop plants to put down roots. Typically, fertilizer implements carry patterns of fertilizer blade assemblies spaced for the simultaneous delivery of fertilizer to a multitude of parallel furrows created by the blades.

Fertilizer implements, such as the Case New Holland Nutri-Placer 940, are designed to apply fertilizer and specifically anhydrous ammonia during seed bed preparation. The fertilizer implement generally consists of a tool bar or main frame that can be hitched to a tractor other towing vehicle. Blades, or combinations of working tools, such as shanks, coulters, knives, banders, and the like, can be mounted to the main frame and are designed to manage crop residue, improve soil tilth, and band plant food in the root zone. As the blades are pulled through the soil, fertilizer, such as anhydrous ammonia, is routed from a tank hitched to the trailing end of the implement to fertilizer outlets integrally formed or mounted adjacent the blades.

A problem with these systems is that the downward pressure on the supporting gauge wheel and closing wheel either wastes energy or causes unnecessary soil disturbance and compaction, or does not seal, thereby allowing the fertilizer to escape.

What is needed in the art is a down pressure control system for the closing wheel that is responsive to a selected pressure, is energy efficient and leaves the soil in an optimal state.

SUMMARY OF THE INVENTION

The present invention provides a closing wheel down pressure control system for a fertilizer applicator system.

The invention in one form is directed to a fertilizer row unit including a toolbar coupling, first and second suspension members, a pressure applying device, a wheel assembly, a knife assembly and a wheel down pressure system. The first suspension member has a first end pivotally coupled to the toolbar coupling. The second suspension member is generally parallel to the first suspension member. The pressure applying device is coupled to the first or second suspension member. The wheel assembly has at least one wheel. The knife assembly is pivotally coupled to both the first and second suspension members. The wheel down pressure system is coupled to the wheel assembly, the wheel down pressure system substantially maintaining a selected pressure on the wheel assembly while the pressure applying device applies varying pressure to at least the first suspension member and the second suspension member.

The invention in another form is directed to a fertilizer applicator having a plurality of fertilizer row units. Each fertilizer row unit including a toolbar coupling, first and second suspension members, a pressure applying device, a wheel assembly, a knife assembly and a wheel down pressure system. The first suspension member has a first end pivotally coupled to the toolbar coupling. The second suspension member is generally parallel to the first suspension member. The pressure applying device is coupled to the first or second suspension member. The wheel assembly has at least one wheel. The knife assembly is pivotally coupled to both the first and second suspension members. The wheel down pressure system is coupled to the wheel assembly, the wheel down pressure system substantially maintaining a selected pressure on the wheel assembly while the pressure applying device applies varying pressure to at least the first suspension member and the second suspension member.

An advantage of the present invention is that optimum performance of the implement occurs during field operation in that maintaining an optimal depth thereby minimizes the draft required for the implement, controls the closing wheel down pressure and minimizes losses of anhydrous ammonia due to inadequate application depth and closing.

Another advantage is that the present invention lessens the chance of damage to an implement in the field by always applying the correct amount of down pressure to the row unit.

Yet a further advantage is that the present invention reduces operator fatigue, especially in fields that have varying soil conditions, and saves the operator a lot of time when switching from field to field.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
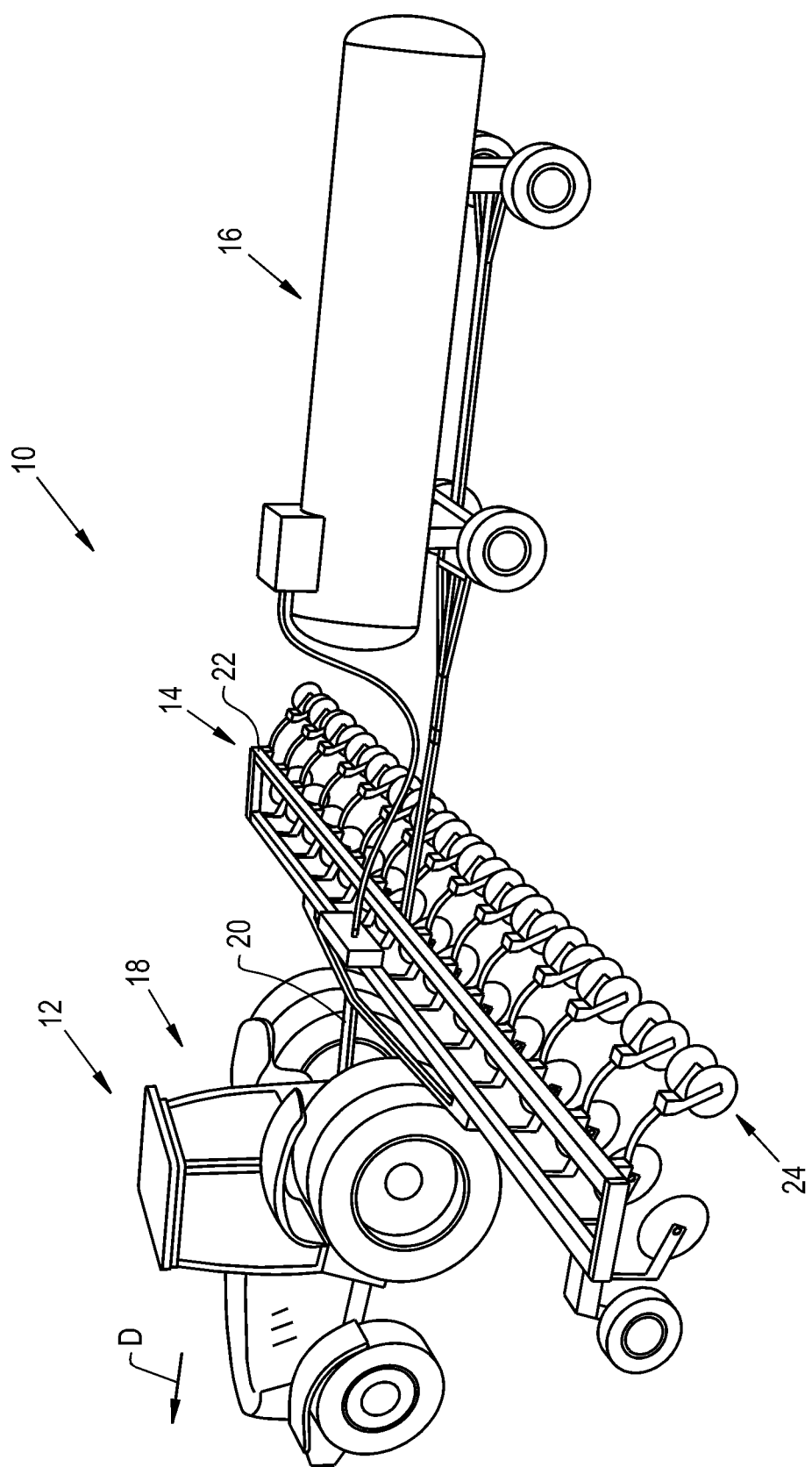
FIG. 1 is a top perspective view of an agricultural implement in the form of a pull-type fertilizer applicator having an embodiment of row units of the present invention incorporated therein.

Referring now to the drawings, and more particularly to FIG. 1, there is shown an embodiment of a fertilizer application system 10 including a tractor 12, a fertilizer applicator 14 and a supply tank 16. Tractor 12 has a control system 18 that includes an input mechanism to ensure that a selected fertilizer application depth is maintained by providing a signal to the depth control system 90 (FIG. 6) of the present invention. Tractor 12 is coupled to fertilizer applicator 14 by way of a hitch 20 that is connected to a toolbar 22. Fertilizer row units 24 are coupled to toolbar 22. As system 10 proceeds in a direction D, liquid fertilizer from supply tank 16 is supplied to a distribution system that supplies the fertilizer to the individual row units 24 for subterraneous application of the fertilizer in the soil.

Figure 2:
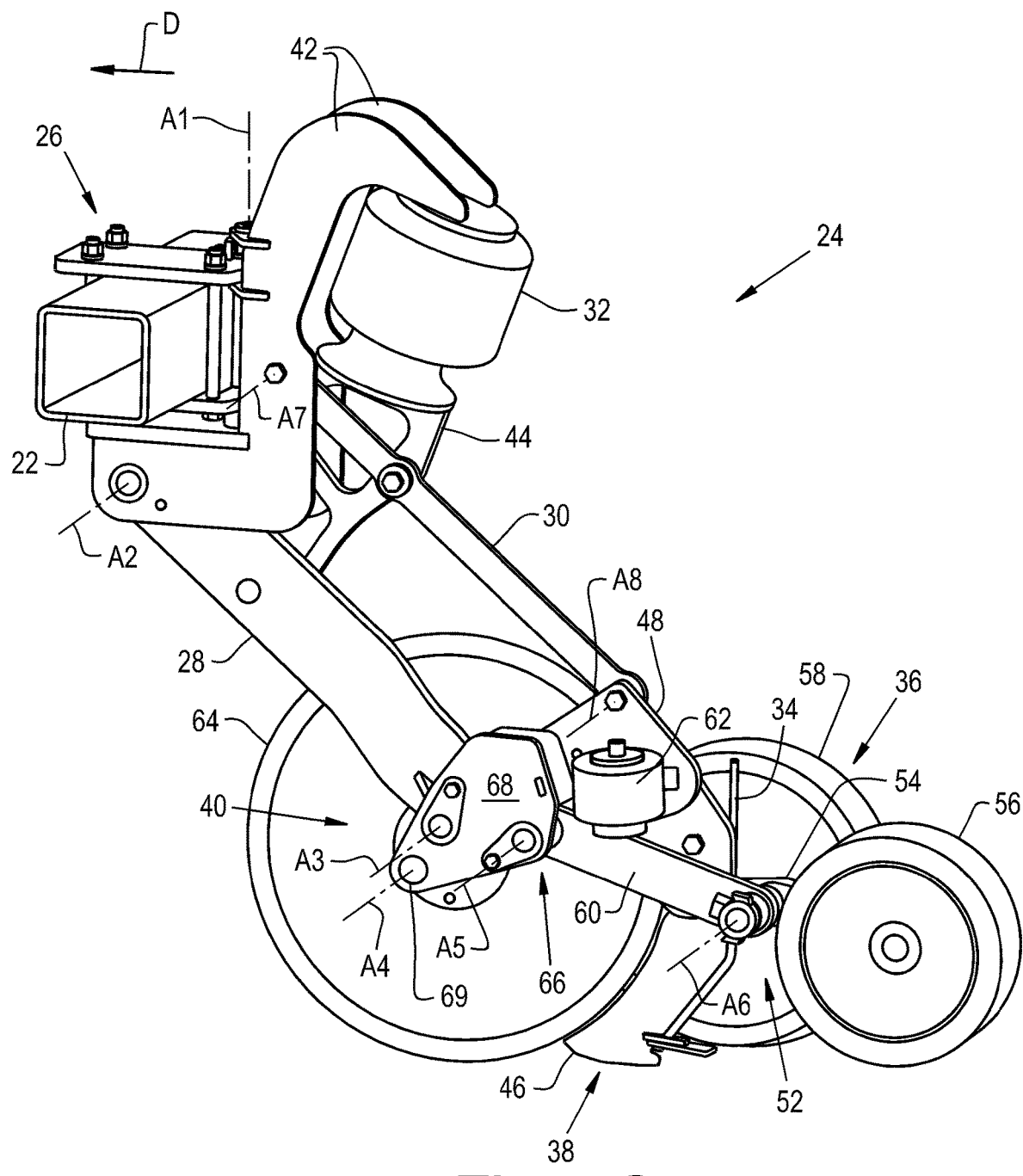
FIG. 2 is a close up view of the row units of FIG. 1.

Now, additionally referring to FIG. 2, there is shown a single fertilizer row unit 24 coupled to a representative portion of toolbar 22 by way of a toolbar coupler 26. Each fertilizer row unit 24 includes the toolbar coupler 26, suspension members 28 and 30, a pressure applying device 32, a fertilizer delivery device 34, a wheel assembly 36, a knife assembly 38, a plate 48, and a depth control system 40, 90. Item 40 illustrating the mechanical aspects and item 90 illustrating the active controlling elements, together being collectively referred to as depth control system 40, 90. Further, row unit 24 also includes brackets 42, and a member 44. Knife assembly 38 includes a knife blade 46 attached to plate 48. Wheel assembly 36 includes a walking axle system 52, a walking axle member 54, a press wheel 56, a gauge wheel 58, a pivotal member 60 and a hydraulic cylinder or air spring device 62 (which can be considered an actuator 62). While wheel assembly 36 is depicted with a walking axle system 52, wheel assembly 36, for purposes of claim interpretation, can also be a disk, a banded disc, a star wheel or other closing device.

Figure 3:
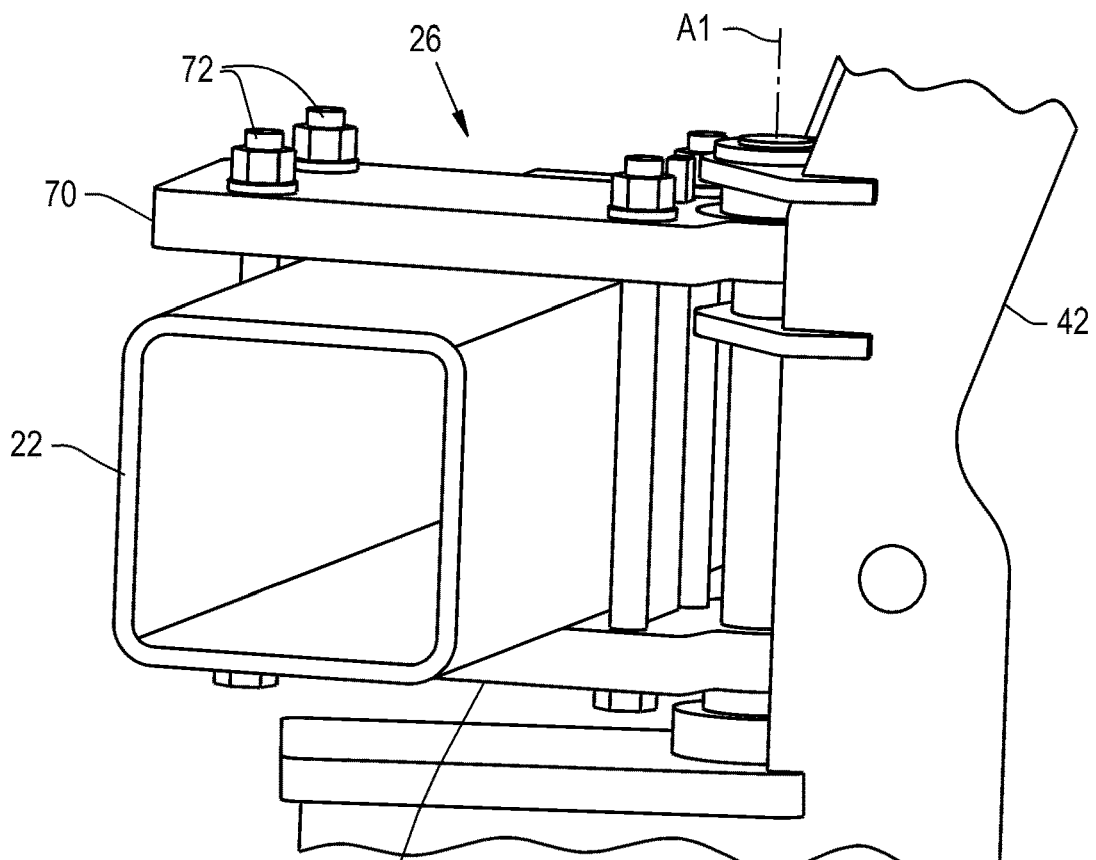
FIG. 3 is a perspective view of the mounting connection of the row units of FIGS. 1 and 2 to a toolbar.
Figure 4:
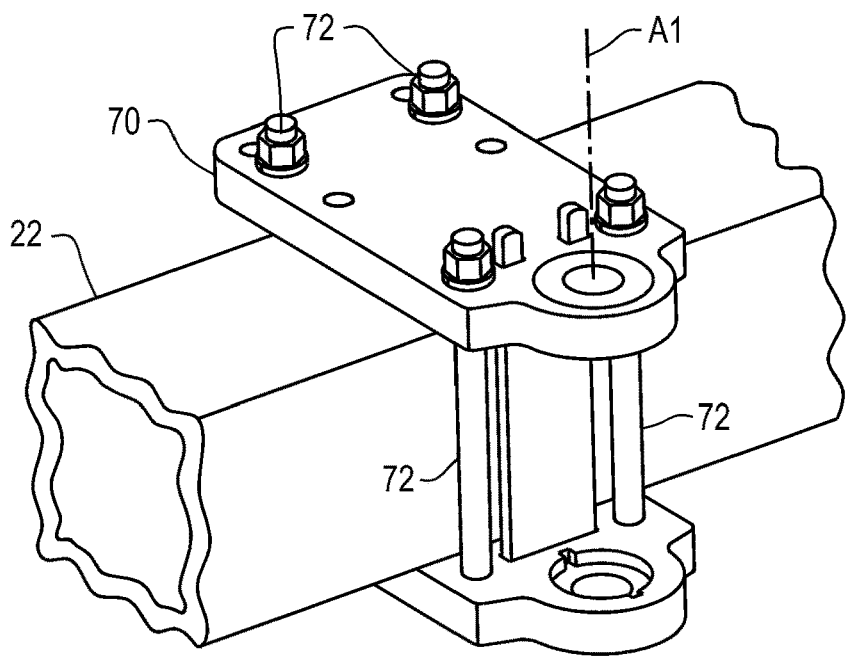
FIG. 4 is a perspective view of part of the hinged mounting of the row units of FIGS. 1 and 2.

Now additionally referring to FIGS. 3 and 4, there are shown some additional details of toolbar coupler 26 having plates 70 coupled to toolbar 22 by way of bolts 72.

During operation, fertilizer applicator 14 is lowered to the ground and is pulled by tractor 12 in direction D, the depth of knife blade 46 is controlled by depth control system 40, 90 that includes a sensor 66 to measure the position of pivotable member 60 to create a measured depth signal. This signal is used by the depth control system 40, 90 to compare to the selected fertilizer application depth signal, also referred to herein as a target depth signal, and to minimize the difference by adding or removing pressure on member 28 by way of pressure applying device 32. Member 44 is pivotally attached to member 30 to stabilize pressure applying device 32. Pressure applying device 32 is illustrated herein as a bellows or a sleeve style air spring 32 that has compressed air or fluid therein at a pressure selected by depth control system 40, 90.

Brackets 42, members 28 and 30 and plate 48 form a parallelogram arrangement so that the pressure applied by way of pressure applying device 32 is applied to knife assembly 38 as well as to an opening disk 64, which is attached to a plate 68 by way of an axle 69, which can be in the form of a welded stud bolt 69. Opening disk 64 rotates about axis A4. Actuator 62, which is illustrated here as air spring 62, tensions wheel assembly 36 so that gauge wheel 58 and closing, or press wheel 56 maintain a firm pressure on the ground. Wheel 56 tracks immediately behind or aft of knife blade 46 as row unit 24 moves in direction D. Walking axle member 54 couples wheels 56 and 58 on opposite sides thereof, allowing the outer perimeters of each wheel to overlap relative to direction D.

Pivotable member 60 can move over a pivotal range, thereby allowing knife blade 46 to maintain the desired depth while press wheel 56 maintains a desired down pressure by wheel assembly 36. Pivotable member 60 has sensor 66 coupled thereto to provide the measured depth signal representative of the depth that the fertilizer is being applied, which relates directly to the depth of knife 46 in the soil.

Toolbar coupling 26 allows for the pivotal movement of row unit 24 about axis A1, which is an upright axis that is generally vertical during field operations and may be canted from vertical when applicator 14 negotiates contours or corners in a field. Suspension member 28 is pivotally coupled to bracket 42 of coupling 26 about axis A2. Axis A2 is generally horizontal and is fore of axis A1 relative to the direction of travel D of row unit 24. The opposite end of suspension member 28 is pivotable about axis A3. Suspension member 30 is also pivotally coupled to bracket 42, of coupling 26, about axis A7. Plate 48 is pivotally connected to member 30 about axis A8, and also to member 28 about axis A3. Axes A3 and A8 as well as axis A4 allow the forward profile of knife blade 46 to move along the outer circumference of disk 64. Pivotal member 60 is pivotally coupled about axis A5 and axis A6.

In the prior art, traditional fertilizer applicators use row units with either knife or a disk coulter assembly to apply liquid/dry fertilizer or anhydrous ammonia to the soil. Many of those applicators (especially the ones with a coulter assembly design) use a gauge wheel to ensure that the exact depth is maintained for applying the nutrients. In those cases, a coiled spring is typically used to keep the row unit in the ground with enough pressure so that the gauge wheel is controlling the depth. If the operator encounters a hard spot in the field, the spring may not apply enough down force to the row unit to make sure the coulter is operating at the proper depth. The only prior art solution in this case is to adjust the spring so that more force is applied to the row unit. Some units are fixed to the toolbar and the depth of application is controlled by adjusting the height of the toolbar. The spring acts as a pressure relief when an obstruction is encountered. The press wheel provides firming (not gauging) until it hits the travel stop.

Another problem with prior art systems arise when an operator decides that they would like to apply the fertilizer deeper than the current set depth. In this case, the operator must manually adjust the depth stop mechanism for each individual row unit and/or the height of the toolbar before continuing the operation.

Yet another problem in prior art systems is that they do not allow the fertilizer row unit to adequately track the direction of travel when farming on contours takes place. The present invention allows for the tracking of row units 24, as they are pivotal about axis A1.

Typically, there is a press wheel that follows the coulter, such as disc 64. The function of this press wheel is to close the trench created by the coulter and to seal the ground. This is especially important when applying anhydrous ammonia. The press wheel quite often is not spring loaded, therefore, the down pressure that is applied to this wheel is equal to the excess force of the row unit down pressure spring less the force that is required to make the coulter penetrate the soil. Unfortunately, this does not allow the operator to provide the desired, uniform down pressure to the press wheel.

Figure 5:
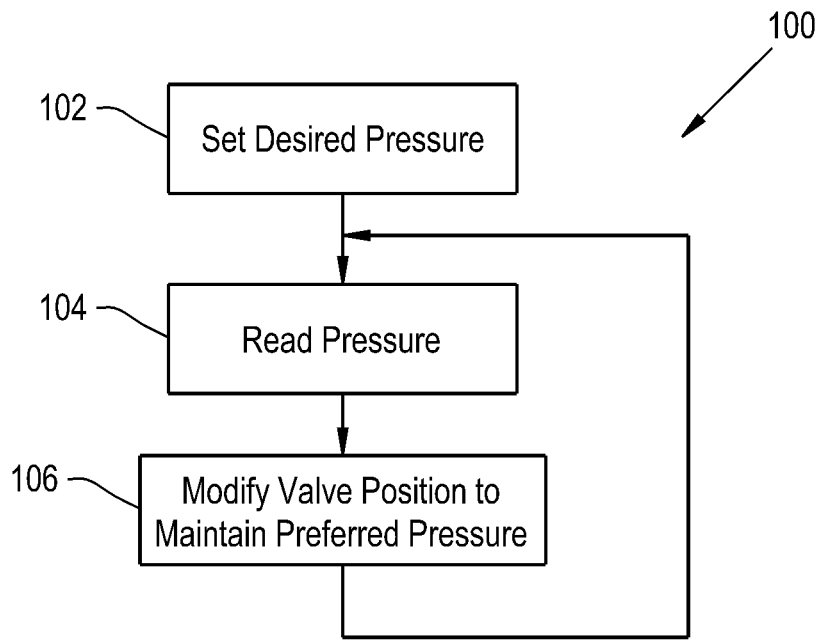
FIG. 5 is a flowchart depicting steps taken by the control system of the row unit of FIGS. 1 and 2.
Figure 6:
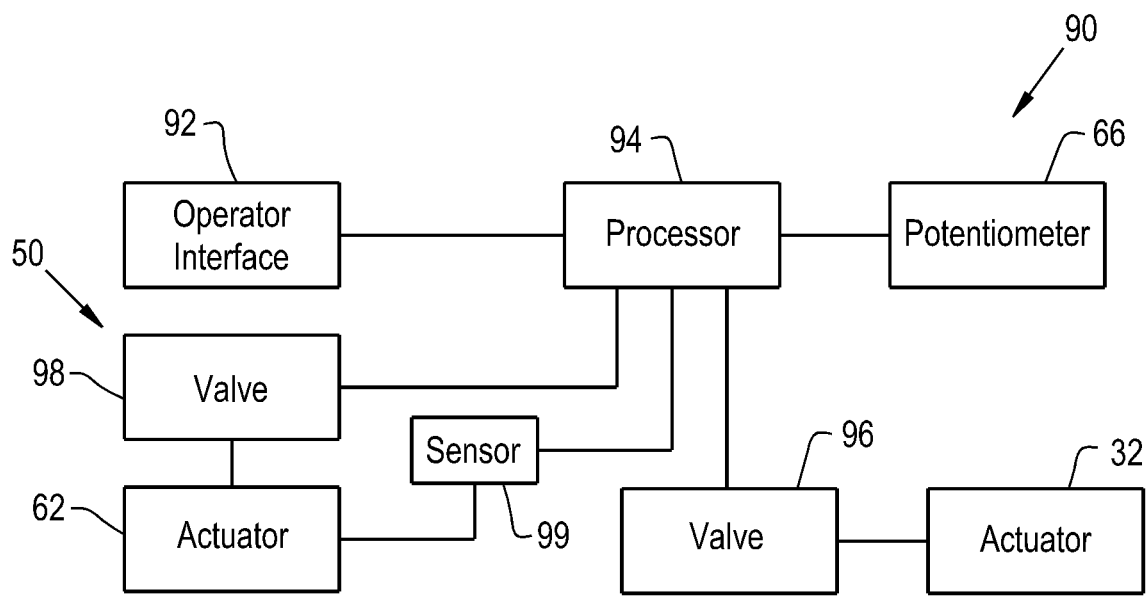
FIG. 6 is a functional block diagram of the system using the steps of the flowchart of FIG. 5.

Now, additionally referring to FIGS. 5 and 6, sensor 66 may be in the form of a potentiometer 66 or another position sensor, and is located on the row unit frame to measure the angle between it and the wheel assembly 36, which includes press wheel 56 and gauge wheel 58. A valve 96 is located on implement 14 (or tractor 12) in order to control the pressure in the actuator 32, which may be a hydraulic cylinder 32 or the pneumatic air spring 32. The tractor 12 or implement 14 must be equipped with a processor 94 that is capable of analyzing the signal from the potentiometer 66 and is able to send a control signal to the valve 96 which supplies the oil to the hydraulic cylinder or air to the pneumatic air spring 32. The tractor 12 or implement 14 is equipped with a wiring harness (not shown for purposes of clarity) to receive the potentiometer signal and to send a control signal to the valve 96.

Depth control system 90 allows the operator to set a desired depth in the tractor cab on an operator interface 92. The processor 94 converts this depth into a preferred press wheel angle that is to be maintained using potentiometer 66 to measure the angle of member 60 for feedback purposes. This conversion can be done by a precalculated formula based on the geometry of the press wheel 56 relative to the row unit frame. A certain minimum pressure is always maintained in the hydraulic cylinder or pneumatic air spring 32. This can also be preset by the operator by way of operator interface 92. As the operator lowers the implement 14 to begin field operation, the potentiometer 66 immediately sends a signal to the processor 94 providing the current operating angle. The processor 94 determines the actual depth of the row unit 24 using the pre-calculated formula and determines if more downward force is required. If the decision is yes, a control signal is sent from the processor 94 to the pressure control valve 96 and control valve 96 provides more pressure to the hydraulic cylinder or pneumatic air spring 32. This sequence is repeated on a regular basis to ensure proper depth of the fertilizer delivery is maintained.

While depth control system 90 is functioning as discussed above, a press wheel down pressure system 50, which includes valve 98, sensor 99 and actuator 62, and uses processor 94, allows the operator to set a desired pressure (at step 102 of method 100) in the tractor cab on an operator interface 92. The processor 94 reads the pressure in actuator 62, at step 104, by receiving a signal from sensor 99, which may be a pressure sensor 99. Since the pressure in air spring 62 is influenced by changes in the depth control system 90 as well as to variations on the ground surface, the pressure in air spring 62 will vary, so down pressure system 50 uses valve 98, which is coupled to a pressure source and to a relief port or tank, to maintain a substantially constant down pressure in air spring 62. This is accomplished by way of the feedback scenario of steps 104 and 106.

As the operator lowers the implement 14 to begin field operation, sensor 99 sends a signal to processor 94 providing the current pressure in actuator 62. The processor 94 determines the actual pressure of the press wheel 56 using a pre-calculated formula that takes into account the geometry of arm 60 and wheel assembly 36 to determine if the pressure in air spring 62 needs to be modified to maintain the desired pressure therein. This can be done by minimizing the difference between the desired pressure signal and the measured pressure signal. The controlled down pressure allows for a more uniform closing of the trench created by coulter 64 and knife 46, thereby efficiently containing the fertilizer in the ground. This sequence is repeated on a regular basis to ensure that proper pressure in air spring 62 is maintained.

An electronic filter can be used to smooth out the signal from the potentiometer 66 in order to prevent the constant "hunting" phenomena by the control system 90. In a like manner a filter can be used to smooth out the pressure signal variation from sensor 99 by pressure control system 50.

The down pressure applied to the press wheel 56 is maintained by keeping the pressure in the hydraulic cylinder or pneumatic spring 32 at a constant pressure. If the pressure in the row unit down pressure system is changed and/or the depth changes, this will most likely result in a change in pressure on the press wheel hydraulic cylinder or pneumatic air spring 62. The processor 94 is responsible for maintaining the pressure and will send out a signal to the control valve 98 to add or remove pressure in order to match the pressure selected by the operator.

While the pressure in air spring 32 is used to maintain a depth of the fertilizer delivery system 34, the pressure on press wheel 56 is maintained by press wheel down pressure system 50 by processor 94 monitoring the pressure in air spring 62 and adjusting valve 98 to maintain the desired downward pressure on press wheel 56. This is maintained regardless of the downward pressure supplied by air spring 32 to control the depth of the fertilizer delivery system 34.

Since potentiometer 66 is unable to sense the position of the press wheel 56 when the row unit 24 is in the ground at the maximum depth and the press wheel arm 60 is at the end of its pivotal range, the system will automatically send a control signal that would decrease the down pressure supplied to air spring 32, until movement of the press wheel arm 60 is detected. This ensures that the minimum amount of down pressure is being applied to the row unit, thus conserving energy and promoting a longer life for the row unit components.

Advantageously, the present inventive solution results in optimum performance of the implement during field operation. Maintaining an optimal depth to thereby minimize draft required for the implement and minimize losses of anhydrous ammonia due to inadequate application depth and trench closing. Additionally, the present invention lessens the chance of damage to an implement in the field by always applying the correct amount of down pressure to the row unit. Yet further, the present invention reduces operator fatigue, especially in fields that have varying soil conditions, and saves the operator a lot of time when switching from field to field.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural fertilizer applicator, comprising:
   a toolbar;
   a fertilizer row unit;
   a plurality of the fertilizer row units coupled to the toolbar, each of the fertilizer row units including:
   a toolbar coupling for coupling the fertilizer row unit to the toolbar;
   a first suspension member having a first end pivotally coupled to the toolbar coupling about a generally horizontal axis;
   a second suspension member generally parallel to the first suspension member;
   a pressure applying device coupled to at least one of the first suspension member and the second suspension member;
   a fertilizer delivery device;
   a wheel assembly having a pivotable member, an actuator for tensioning the wheel assembly, a press wheel, and a gauge wheel for traversing across soil, the press wheel and the gauge wheel are coupled to the pivotable member by way of a walking axle member;
   a knife assembly including a knife blade, the knife blade having the fertilizer delivery device coupled thereto, the knife assembly being pivotally coupled to both the first suspension member and the second suspension member; and
   a depth control system including a sensor connected to the pivotable member for measuring a position of the pivotable member, the depth control system controlling a depth of the knife blade; a wheel down pressure system coupled to the wheel assembly, the wheel down pressure system substantially maintaining a selected pressure on the press wheel, wherein while the pressure applying device applies a varying pressure to at least one of the first suspension member and the second suspension member, for maintaining a depth of the fertilizer delivery device, the selected pressure on the press wheel is maintained by the actuator, regardless of the varying pressure applied by the pressure applying device for maintaining the depth of the fertilizer delivery device.

2. The agricultural fertilizer applicator of claim 1, wherein the wheel down pressure system additionally receives a pressure signal from an operator, the wheel down pressure system being configured to minimize a difference between the pressure signal and a measured pressure signal.

3. The agricultural fertilizer applicator unit of claim 2, wherein the pivotable member is coupled between the gauge wheel and to the depth control system or to the knife assembly.

4. The agricultural fertilizer applicator of claim 1, wherein the pivotable member is coupled between gauge the wheel and to the depth control system or to the knife assembly.

5. The agricultural fertilizer applicator of claim 1, wherein the press wheel and the gauge wheel are on opposite sides of the walking axle member.

6. The agricultural fertilizer applicator of claim 5, wherein the first wheel follows the knife assembly and the fertilizer delivery device in a direction in which the fertilizer row unit travels.

7. The agricultural fertilizer applicator of claim 1, wherein the toolbar coupling is pivotal along a generally upright axis.

8. The agricultural fertilizer applicator of claim 7, wherein part of the fertilizer row unit is fore of the generally upright axis relative to a direction in which the fertilizer row unit travels.

9. The agricultural fertilizer applicator of claim 8, wherein the first end of the first suspension member is generally horizontally pivotally coupled to the toolbar coupling fore of the generally upright axis.

* * * * *